United States Patent

[11] 3,577,096

| [72] | Inventors | William B. Bridges |
| | | Thousand Oaks; |
| | | Peter O. Clark, Malibu, Calif. |
| [21] | Appl. No. | 679,704 |
| [22] | Filed | Nov. 1, 1967 |
| [45] | Patented | May 4, 1971 |
| [73] | Assignee | Hughes Aircraft Company |
| | | Culver City, Calif. |

[54] TRANSVERSE DISCHARGE GAS LASER
12 Claims, 6 Drawing Figs.

[52] U.S. Cl. ..................................................... 331/94.5,
328/251
[51] Int. Cl. ....................................................... H01s 3/00
[50] Field of Search............................................ 331/94.5
(Loser Digest) (Gas Loser Digest); 328/251

[56] References Cited
UNITED STATES PATENTS

| 3,149,290 | 9/1964 | Bennett et al................. | 331/94.5 |
| 3,302,127 | 1/1967 | Lin............................... | 331/94.5 |
| 3,396,301 | 8/1968 | Kobayashi et al............. | 313/210 |
| 3,437,954 | 4/1969 | Herriott et al. ............... | 331/94.5 |
| 3,274,512 | 9/1966 | Okaya........................... | 331/94.5 |

OTHER REFERENCES

" Nitrogen Laser Action in a Supersonic Flow," by J. Wilson, Applied Physics Ltrs. 4/1/66 Vol. 8 No. 7 159— 161.

*Primary Examiner*—Ronald L. Wibert
*Assistant Examiner*—Paul K. Godwin
*Attorneys*—James K. Haskell and John Holtrichter, Jr.

ABSTRACT: This invention relates to a gas laser wherein laser energy regeneratively propagates along regenerative paths through a gaseous laser medium and between spaced reflectors. The laser medium is pumped to an excited state to generate laser energy along said regenerative paths by causing an electrical discharge to be maintained through the laser medium across or transverse to the regenerative paths. In one embodiment, the gaseous laser medium is caused to flow through the laser cavity transverse to the laser optical path; and in another embodiment, a multiply folded path laser cavity is utilized.

INVENTOR.
WILLIAM B. BRIDGES,
PETER O. CLARK,
BY John Holtrichter J.
ATTORNEY 3,577,096

TRANSVERSE DISCHARGE GAS LASER

There has been much development in the gas laser art in the years past, leading to higher power and more efficient laser configurations. Such gases as neon, others krypton, argon, helium and mixtures of these and other such as $CO_2$ have been shown to provide laser oscillations in a broad area of the electromagnetic spectrum. Although there is a wide range of gases and pressures used in present-day lasers, there is one aspect that is common to all and that is the use of long, thin discharge tubes with the optical axis lying along the long dimension of the discharge. This necessitate a rather long discharge path and, as a consequence thereof, rather large discharge voltages are required.

Also, much work has been done using the technique of causing the active gas to flow along the optical axis of the laser, i.e., along the long dimension of the discharge. The flow technique provides a means where contaminants produced by the gas discharge may be removed from the laser but because of the relatively constricted flow cross section provided, only low to moderate gas flow rates could be accommodated, thus restricting the amount of contaminants that can be removed from the system in any period of time.

In a relatively recent development of the gas laser art, the size, or more specifically the length of the gas discharge tube, has been reduced by what is called the "folding" technique. Here, reflectors are placed at approximately 180° folds in a discharge tube in such a manner that the optical axis is turned nearly back upon itself in order to provide a relatively long laser-regenerative path but taking up less space because of the folds in the optical path made within the discharge tube. The reflectors can either by disposed within the discharge tube or outside but adjacent to the folds. Also, separate parallel lengths of discharge tube can be used with appropriately positioned reflectors to accomplish the same result but because of the many boundary conditions present and the increased problem in providing proper discharge paths and gas flow paths through the several lengths of the discharge tubes, many of the advantages of the "folding" technique cannot be fully realized.

It should be obvious from the above that a gas laser that requires a much lower discharge voltage for a given optical path length, that retains this advantage in a folded configuration and that allows for a much greater gas flow rate for improved gas decontamination would be a great advance in the gas laser art.

It is therefore an object of the present invention to provide an improved gas laser.

It is another object of the invention to provide a gas laser requiring lower discharge voltages than heretofore possible.

It is still another object of the invention to provide a gas laser having an improved folded optical path configuration.

It is yet another object of the present invention to provide a gas laser having a more compact folded optical configuration.

It is also another object of the present invention to provide a gas-flow-type laser having a much higher gas flow rate to remove contaminants more rapidly than previously possible.

These and other objects are provided in accordance with one embodiment of the invention comprising a gaseous laser medium which is disposed in a regenerative laser cavity including spaced reflectors wherebetween laser energy regeneratively propagates along regenerative paths through the laser medium when the medium is excited to a lasing state. The medium is so excited by discharge electrodes disposed in a manner to cause an electrical discharge to be maintained through the laser medium across the regenerative paths followed by the laser energy within the laser cavity. The electrodes may also serve as conduits for the passage of a flow of the gaseous laser medium across these regenerative paths.

The invention and specific embodiments thereof will be described hereinafter by way of example and with reference to the accompanying drawings wherein like reference numerals refer to like elements or parts and in which.

Figure 1:
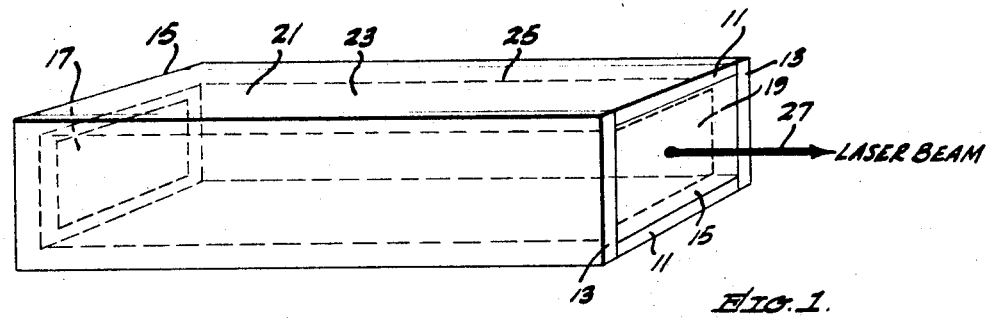
FIG. 1 is a perspective view of a transverse discharge gas laser according to the invention.

With reference now to the drawings and more particularly to FIG. 1, there is shown a transverse discharge gas laser of rectangular shape and having spaced broad walls 11 and spaced narrow sidewalls 13 and end walls 15, all of insulative material such as plate glass, for example. Also included is a substantially totally reflective mirror 17 mounted on one of end walls 15 and a partially transmissive mirror 19 mounted on the other end wall 15. In this embodiment, the structure is substantially gastight and a laser-active material in gaseous form such as argon or xenon, krypton or mixtures such as $CO_2$, $N_2$ and He is disposed therein, as designated by reference numeral 21. On the inner wall 23 of the sidewalls 13 is either mounted metal-conductive plates 25 covering substantially the total inner wall area or a conductive layer of metal may be deposited or otherwise affixed to this wall area to act as discharge electrodes. The electrodes 25 are connected by wires not shown to a supply of voltage to cause a discharge to occur through the active laser gas 21. The mirrors 17 and 19 constitute a regenerative laser cavity wherebetween laser energy regeneratively propagates along regenerative paths between the mirrors and through the active laser gas when the laser gas is excited to a lasing state by causing an electrical discharge to be maintained through this gas across these regenerative paths. A single put output laser beam is provided by this embodiment as designated by the arrow 27. However, if the mirror 17 was made partially transmissive, a second laser beam not shown would be produced in the opposite direction from the beam 27.

Figure 2:
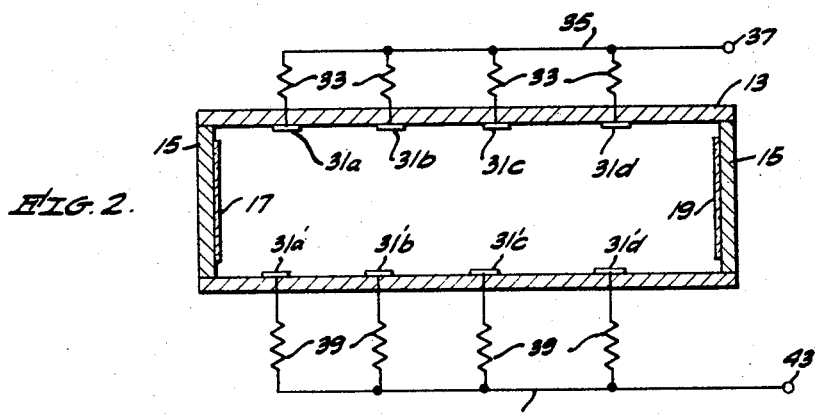
FIG. 2 is a plan view of a transverse discharge gas laser according to another embodiment of the invention.

The embodiment shown in FIG. 2 is similar to that illustrated in FIG. 1 except that multiple electrodes 31 and 31' are mounted or deposited on opposite inner walls 23 of the sidewalls 13. All of the electrodes on one of the walls are connected through current-balancing resistors 33, a wire 35 and to a terminal 37 adapted to be connected to one of the output terminals of a power supply, not shown. The electrodes 31', mounted on the opposite sidewall, are also shown connected in parallel through current-limiting resistors 39 and wire 41 to a second terminal 43 for connection to the remaining terminal of the power supply. In most cases, it may be found that either the resistors 33 or 39 may be deleted and still provide a uniform discharge between corresponding opposite electrodes 31 and 31' and between adjacent electrodes a, b, c, d. In fact in some instances, it may be found that uniform discharge is available without the use of the current-balancing resistors 33 or 39.

Figure 3:
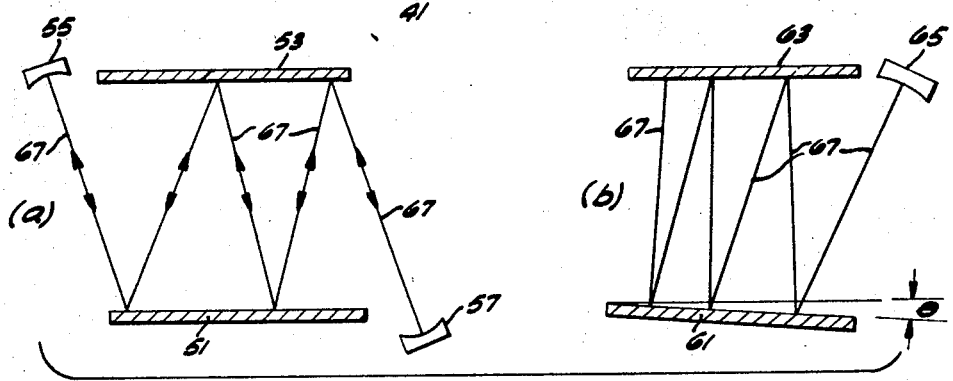
FIG. 3 illustrates two improved folded optical path configurations of the invention.

The wide, flat shape of the active medium lends itself well to the use of folded optical paths, examples of which are shown in FIG. 3a and 3b This illustration is not drawn to scale and is shown merely to illustrate at least two techniques whereby a relatively long path length is achieved in a relatively short resonant cavity structure. Flat mirrors 51 and 53 are disposed within the cavity structure such as the ones that are shown in FIG. 1 or FIG. 2, with the addition of path-terminating spherical mirrors 55 and 57 positioned adjacent opposite ends of the flat mirrors 53 and 51, respectively (see FIG. FIG. 3a. The configuration shown in FIG. 3b is similar to the one just described except that in order to eliminate the need of one of the spherical mirrors, the resonant cavity comprises two flat mirrors 61 and 63 and a single spherical mirror 65 where the mirror 61 is disposed at a slight angle $\theta$ with respect to a plane parallel to the other mirror 63 for reasons obvious from the FIG. In the arrangement shown in FIG. 3, the laser-regenerative paths are shown as lines 67 where the arrows show the direction of the laser energy.

Figure 4:
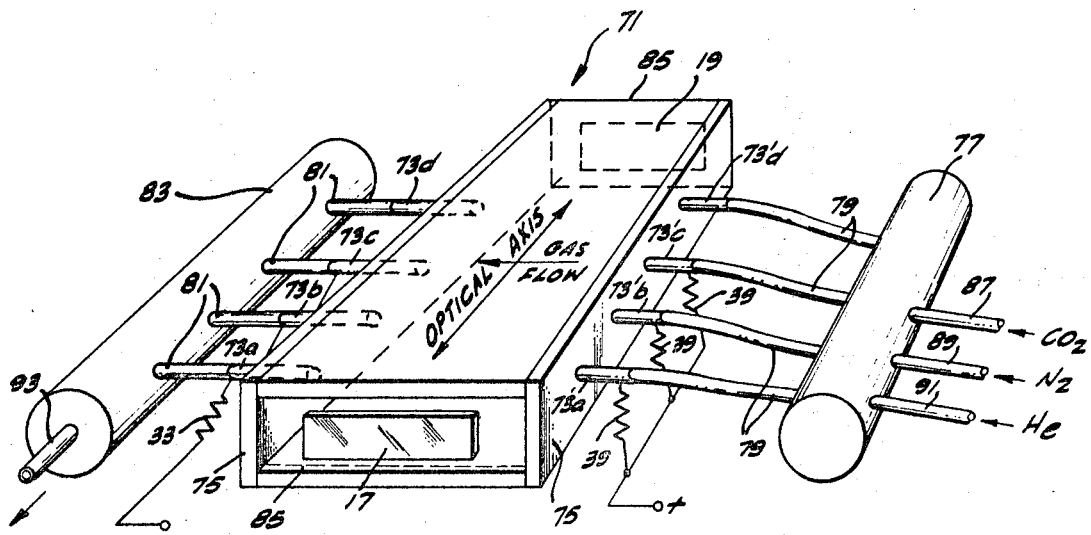
FIG. 4 is a perspective view illustrating a preferred embodiment of the invention having a transverse gas flow.

With reference to FIG. 4, there is shown an insulative rectangular enclosure 71 constructed, for example, of plate glass. It is similar generally to the structure shown in FIG. 2. Here, instead of flat plate electrodes 31, this embodiment uses a plurality of tubular electrodes 73 disposed through holes in the narrow sidewalls 75. This embodiment specifically provides for a flow of the active laser gas from a source of such gas, such as the mixing tank 77, through insulated tubing 79 and apertures not shown in the electrodes 73. It then flows across or transverse to the regenerative laser paths within the structure 71 and out through apertures in the electrodes 73, insulated tubing 81 and into a sink for the gas such as a vacuum ballast tank 83. As in the previous embodiment, the regenerative cavity may utilize mirrors 17 and 19 shown in FIGS. 1 and 2, disposed in end walls 85 of the structure 71, or regenerative cavity configurations similar to those shown in FIG. 3 may be utilized. Again, current-balancing resistors 33 and 39 may be utilized in order to provide a uniform discharge along the regenerative paths of the laser energy within the structure 71. The mixing tank 77 shows three input gas lines 87, 89 and 91 for the introduction of $CO_2$, $N_2$ and He, respectively. However, where only a single gas or a combination of more or less gases is desired to be introduced into the structure 71, corresponding input gas lines may be provided. In order to provide an even gas flow through the structure 71, a vacuum pump, not shown, may be connected to an exhaust line 93 mounted on and communicating with the vacuum ballast tank 83.

In a transverse discharge gas laser constructed similarly to that shown in FIG. 4, a discharge was struck between the electrodes 73 and 73' mounted on opposite sides of the cavity. It was found that the voltage drop of the device was much smaller than that of the usually long, thin tubular discharge of gas lasers having equivalent active volumes. It was also found that the gas flow rate could easily be made higher than previously obtainable by use of the configuration shown in FIG. 4, since the gas need only flow across the optical path and not along it.

Figure 5:
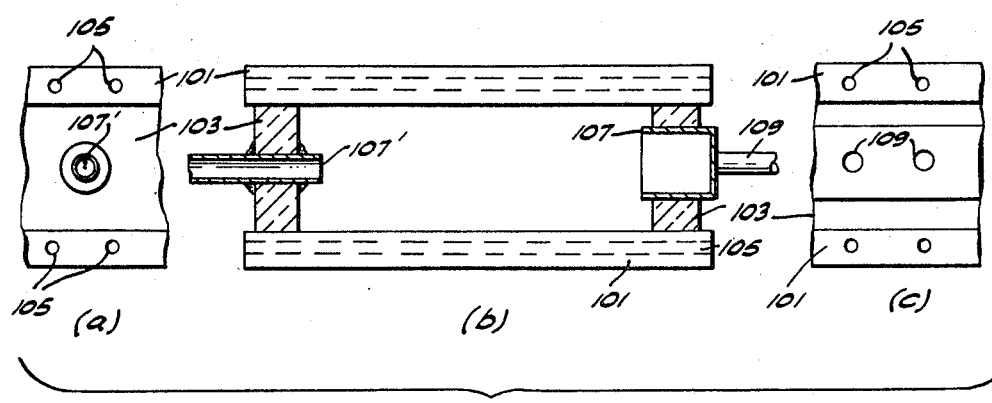
FIG. 5 is a cross-sectional elevation view of an embodiment constructed according to the invention wherein metal sidewalls are used rather than insulating types.

Still another embodiment of the invention that has been constructed and tested utilizes metal broad walls 101 and insulating dielectric narrow walls 103, as shown in FIG. 5. The use of metal facilitates the cooling of the walls, which was accomplished in this case by drilling holes 105 in the metal broad walls 101 and flowing cooling water through them. The dielectric narrow walls 103 were drilled and adapted to support cathode electrodes 107 and anode electrodes 107', leaving the metal broad walls 101 simply floating in potential. Discrete tubular electrodes can be used when it is necessary to separate them electrically for current-balancing purposes, as shown by the anode electrode 107'. A continuous strip electrode can be used when current balance is unnecessary or is accomplished at the other electrode. As shown in this FIG., the cathode electrode 107 is the continuous distributed electrode type having gas pipes 109 mounted thereon. Where the sidewalls are fabricated from metal as shown here, an over coat of a thin insulator, as for example provided by anodizing, may be deposited on the inner surface of the wall where it is found that the discharge voltage is sufficiently high to cause breakdown to the walls. FIGS. 5a and c are merely views looking at the narrow walls in elevation in order to more clearly describe the differences between the discrete- and distributed-type electrodes.

Figure 6:
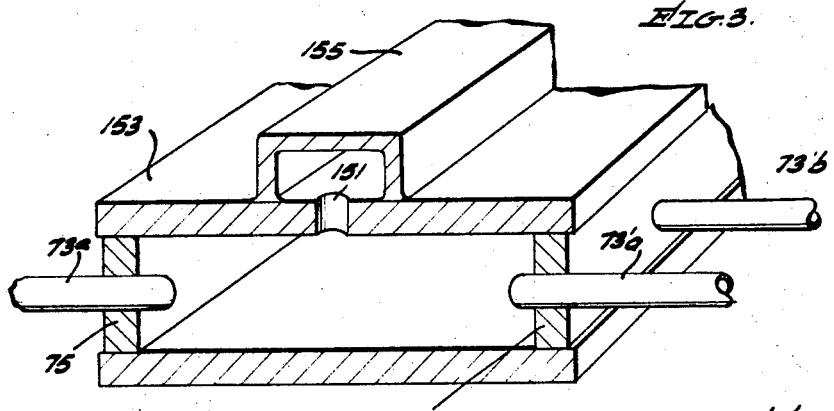
FIG. 6 is a partial perspective view of yet another embodiment of the invention that will allow higher gas flow rates.

The embodiment illustrated in FIG. 6 indicates a technique where the gas may be circulated through both cathode and anode electrodes, transverse to the regenerative paths, and then removed through holes 151 in a broad wall 153 partially covered by a U-shaped cover 155 in order to allow even higher gas flow rates.

From the foregoing, it should be evident that the transverse discharge gas laser, according to the invention, allows the use of much lower discharge voltages, provides improved folded optical path configuration and much higher gas flow rates than heretofore available.

In practicing the invention, any active laser material in a gaseous state may be utilized and although specific embodiments of the invention have been described in detail, other organizations of embodiments shown may be made within the spirit and scope of the invention.

We claim:

1. A gas laser comprising:
   a gaseous laser medium;
   a regenerative laser cavity including spaced reflectors disposed about said laser medium such that laser energy regeneratively propagates between said reflectors along a regenerative path through said laser medium when said laser medium is excited to a lasing state;
   means coupled to said laser cavity for exciting said laser medium to said lasing state by causing an electrical discharge to be continually maintained through said laser medium transverse to said regenerative path;
   means for causing said gaseous laser medium to flow transverse to said regenerative path; and
   means coupled to said laser cavity for coupling therefrom an output laser beam.

2. A gas laser according to claim 1, wherein said laser energy regeneratively propagates along essentially parallel regenerative paths through said laser medium.

3. A gas laser according to claim 1, wherein said laser energy regeneratively propagates along a multiply-folded regenerative path through said laser medium.

4. A gas laser according to claim 3, wherein said folded regenerative path terminates in two reflectors reflecting laser energy essentially parallel to laser energy incident thereon.

5. A gas laser according to claim 1, wherein said regenerative cavity comprises a closed rectangular structure having said spaced reflectors mounted in insulated end walls thereof and having two opposite broad walls of insulating material and further having two opposite narrow walls of conductive material across which said means for exciting said laser medium is coupled.

6. A gas laser according to claim 1, further comprising current-balancing means and wherein said regenerative cavity comprises a rectangular structure of insulating material having said spaced reflectors mounted in the end walls thereof and having opposite narrow walls wherein there are disposed a plurality of opposite and corresponding electrodes, the electrodes on each of said narrow walls being insulated from each other and connected through said current-balancing means to said means for exciting said laser medium.

7. A gas laser according to claim 6, further comprising a source and sink of said laser medium and wherein said electrodes have passageways therethrough and those of said electrodes in one of said narrow walls are coupled to said source of said laser medium and those of said electrodes in the other of said narrow walls are coupled to said sink of said laser medium.

8. A gas laser according to claim 3, further comprising current-balancing means and wherein said regenerative cavity comprises a rectangular structure of insulating material having said spaced reflectors mounted in the end walls thereof and having opposite narrow walls wherein there are disposed a plurality of opposite and corresponding electrodes, the electrodes on each of said narrow walls being insulated from each other and connected through said current-balancing means to said means for exciting said laser medium.

9. A gas laser according to claim 8, further comprising a source and sink of said laser medium and wherein said electrodes have passageways therethrough and those of said electrodes in one of said narrow walls are coupled to said source of said laser medium and those of said electrodes in the other of said narrow walls are coupled to said sink of said laser medium.

10. A gas laser according to claim 8, further comprising a source and sink of said laser medium and a manifold member attached to said rectangular structure, and wherein said electrodes have passageways therethrough and are coupled to and communicate with said source of said laser medium and wherein said rectangular structure has spaced broad walls, one of which being provided with a plurality of centrally positioned apertures along the length thereof, said apertures providing gas flow communication between the interior of said structure and said manifold which in turn is coupled to said sink of said laser medium.

11. A gas laser comprising:
a gaseous laser medium;
a regenerative laser cavity comprising a closed rectangular structure disposed about said laser medium and having spaced reflectors mounted in insulated end walls thereof such that laser energy regeneratively propagates between said reflectors along a regenerative path through said laser medium when said laser medium is excited to a lasing state, said regenerative cavity further having two opposite broad walls of insulating material and two opposite narrow walls of conductive material;
means coupled across said narrow walls for exciting said laser medium to said lasing state by causing an electrical discharge to be continually maintained through said laser medium transverse to said regenerative path; and
means for coupling an output laser beam through at least one of said end walls.

12. A gas laser comprising:
a gaseous laser medium;
a regenerative laser cavity comprising a rectangular structure of insulating material disposed about said laser medium and having spaced reflectors mounted in end walls thereof such that laser energy regeneratively propagates between said reflectors along a regenerative path through said laser medium when said laser medium is excited to a lasing state, said regenerative cavity further having opposite narrow walls wherein there are disposed a plurality of opposite and corresponding electrodes;
current-balancing means;
means coupled to said electrodes through said current-balancing means for exciting said laser medium to said lasing state by causing an electrical discharge to be continually maintained through said laser medium transverse to said regenerative path; and
means for coupling an output laser beam through at least one of said end walls.

PO-1050
(5/69)

UNITED STATES PATENT OFFICE
CERTIFICATE OF CORRECTION

Patent No. 3,577,096     Dated May 4, 1971

Inventor(s) William B. Bridges and Peter O. Clark

It is certified that error appears in the above-identified patent and that said Letters Patent are hereby corrected as shown below:

Col. 1, line 4, delete "others" and substitute therefor --xenon
       line 11, "necessitate" should be --necessitates--.
Col. 2, line 68, after "see", delete "FIG".
Col. 3, line 11, "73" should be --73'--.
       line 16, "88" should be --83--.

Signed and sealed this 26th day of October 1971.

(SEAL)
Attest:

EDWARD M. FLETCHER, JR.         ROBERT GOTTSCHALK
Attesting Officer                Acting Commissioner of Patents